United States Patent

Lowry et al.

[15] 3,677,497

[45] July 18, 1972

[54] TAPE CARTRIDGE MECHANISM FOR COMPUTER

[72] Inventors: Alan B. Lowry, Canton; Gregory Mathus, Cambridge, both of Mass.; Leon Staciokas, Lionville, Pa.

[73] Assignees: Data Packaging Corporation, Cambridge, Mass.; Digital Information Devices, Inc., Norristown, Pa.

[22] Filed: June 8, 1970

[21] Appl. No.: 44,112

[52] U.S. Cl. ....................242/199, 274/4 C

[51] Int. Cl. ....................G03b 1/04, G11b 15/32, G11b 23/04

[58] Field of Search ....................242/197–200; 274/4 C, 11 C; 352/72, 73, 78; 206/52 F, 59 E

[56] References Cited

UNITED STATES PATENTS

| | | | |
|---|---|---|---|
| 2,676,766 | 4/1954 | Ross et al. | 242/76 |
| 2,926,861 | 3/1960 | Murdoch | 242/200 |
| 2,951,654 | 9/1960 | Steelman | 242/198 X |
| 3,556,433 | 1/1971 | Abitboul | 242/199 |

*Primary Examiner*—Leonard D. Christian
*Attorney*—Wolf, Greenfield and Sacks

[57] ABSTRACT

A cartridge having a stabilizer system for standard IBM-type computer tape reels that may be placed in the cartridge for recording and subsequently be removed from the cartridge for use on a computer. A separate take-up reel is provided in the cartridge onto which the tape is wound. Each reel is movable axially and laterally in the cartridge and can be engaged by external drive spindles.

20 Claims, 12 Drawing Figures

INVENTORS
ALAN B. LOWRY
GREGORY MATHUS
LEON STACIOKAS
BY Wolf Greenfield Hieken + Sacks
ATTORNEYS INVENTORS
ALAN B. LOWRY
GREGORY MATHUS
LEON STACIOKAS
BY
Wolf Greenfield Hieken & Sacks
ATTORNEYS Patented July 18, 1972 3,677,497

4 Sheets-Sheet 3

INVENTORS
ALAN B. LOWRY
GREGORY MATHUS
LEON STACIOKAS
BY Wolf, Greenfield Hieken & Sacks
ATTORNEYS INVENTORS
ALAN B. LOWRY
GREGORY MATHUS
LEON STACIOKAS
BY Wolf, Greenfield, Hieken & Sacks
ATTORNEYS

TAPE CARTRIDGE MECHANISM FOR COMPUTER

SUBJECT MATTER AND BACKGROUND OF THE INVENTION

This invention relates to the handling of magnetic tape and more particularly concerns improvements for a magnetic tape cartridge that houses computer tapes and reels. One such cartridge is shown in a copending application Ser. No. 781,875, filed Dec. 6, 1968 and abandoned in favor of copending application Ser. No. 93,467, filed Nov. 27, 1970, and the improvements disclosed herein are adapted for use therewith. These cartridges may be used with a special input device for recording information on the tape or with a direct input and readout computer system.

It is presently the practice in connection with many input devices to provide the operator with an IBM-type compatible reel loaded with tape, and the operator is required to thread the tape in the input device as part of the regular set up prior to regular operation. After the desired input has been recorded on the tape, the operator rewinds the tape on the reel and it is subsequently transferred to the computer. Careless handling of the tape at the input device or at the computer can damage the tape and may result in inaccurate or inconsistent recordings and readings. In accordance with the present invention a cartridge is provided for the standard reel and tape, which eliminates the need for careful and skillful handling. More particularly, this invention is embodied in a simple cartridge system which enables unskilled clerical personnel to handle the tape both at an input device and a computer installation.

One important object of this invention is to provide a self contained cartridge for computer tape, which permits recording on and reading of the tape without removing the reel or reels from the cartridge.

Another important object of this invention is to provide a cartridge for IBM-type compatible reels, which allows the loaded reel inside to be used while in the cartridge as well as when it is removed.

A more specific object of this invention is to provide a cartridge for an 8 ½ inch IBM-type compatible reel, which is just slightly larger than the reel itself but which nevertheless has means for winding the tape between the reel and a separate takeup reel in the cartridge.

Yet another important object of this invention is to provide a cartridge for computer tape which is sealed when not in use to protect the tape inside.

Yet another specific object of this invention is to provide means for aligning a reel in a cartridge with an external spindle.

Still another object of the invention is to provide a locking member for securing the cover and base of the tape cartridge together.

Another object of the invention is to provide a tape cartridge with a plurality of guide means including grooves for guiding the tape between the supply and takeup reels.

Still another object of this invention is to provide a tape cartridge which supports a supply and take-up reel in a manner that allows drive spindles to couple both mechanically and pneumatically to them.

SUMMARY OF THE INVENTION

To accomplish these and other objects, the tape cartridge of this invention comprises a cover and a base adapted to be opened and closed. A supply reel stabilizing system is provided in the cartridge toward the rear thereof which is designed to carry an IBM-type compatible reel. The stabilizing system allows the reel to move a limited extent both axially and laterally so as to allow the reel to align itself with the drive spindles and to move away from the brake pad which it ordinarily bears against to prevent rotation. A separate take-up reel is provided in the cartridge which is also movable both axially and laterally for the same reasons as the supply reel. An opening in the front wall of the cartridge enables the course of tape between the two reels to be withdrawn from the cartridge into contact with an external input or reading head. The opening in the front wall of the cartridge also enables the tape on the take-up reel to extend out of the cartridge so that the cartridge interior may be made relatively small.

These and other objects and features of this invention along with its incident advantages will be better understood and appreciated from the following detailed description of one embodiment thereof, selected for purposes of illustration and shown in the accompanying drawings in which:

DETAILED DESCRIPTION

Figure 1:
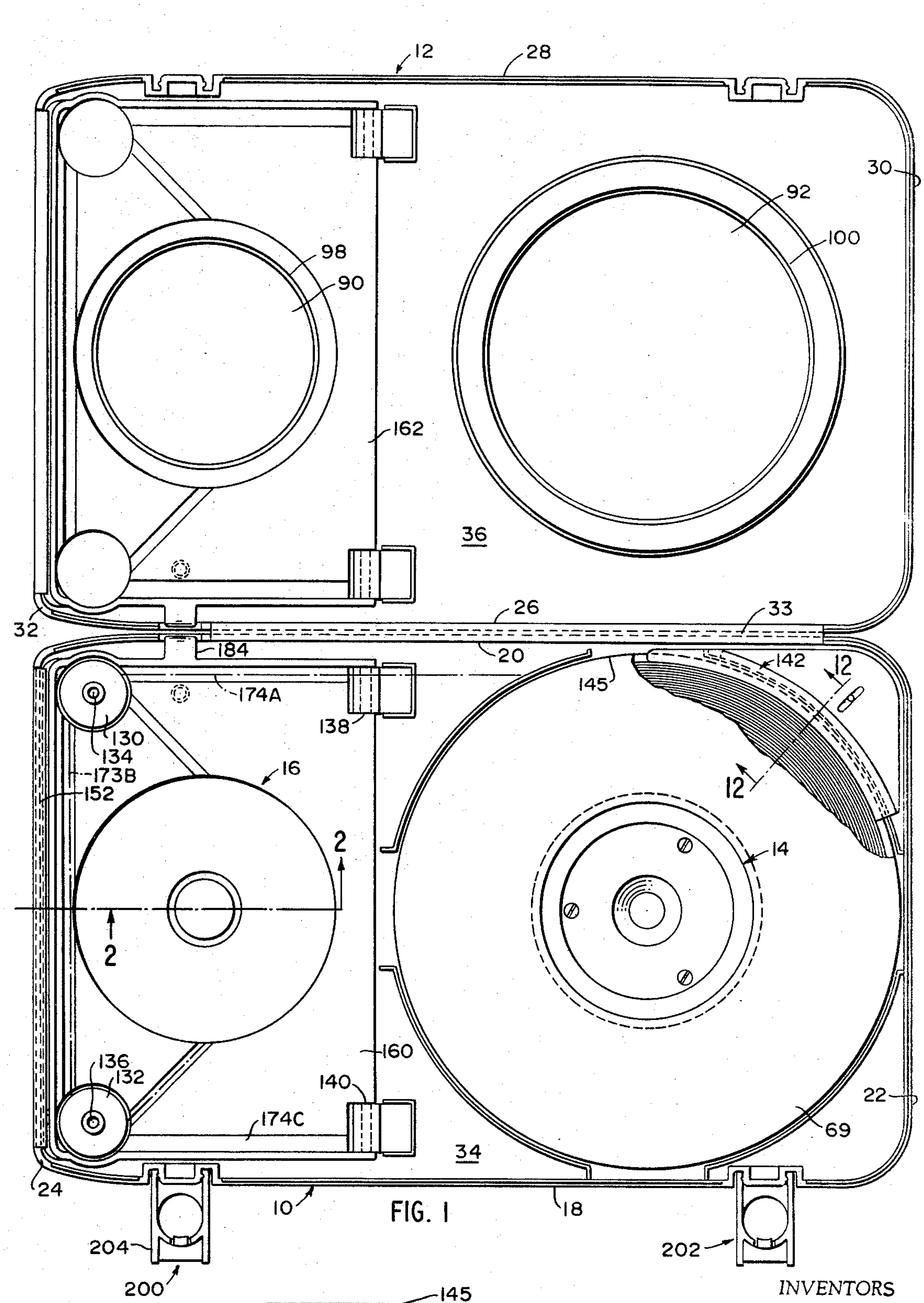
FIG. 1 is a plan view of an open cartridge, constructed in accordance with the principles of this invention.
Figure 2:
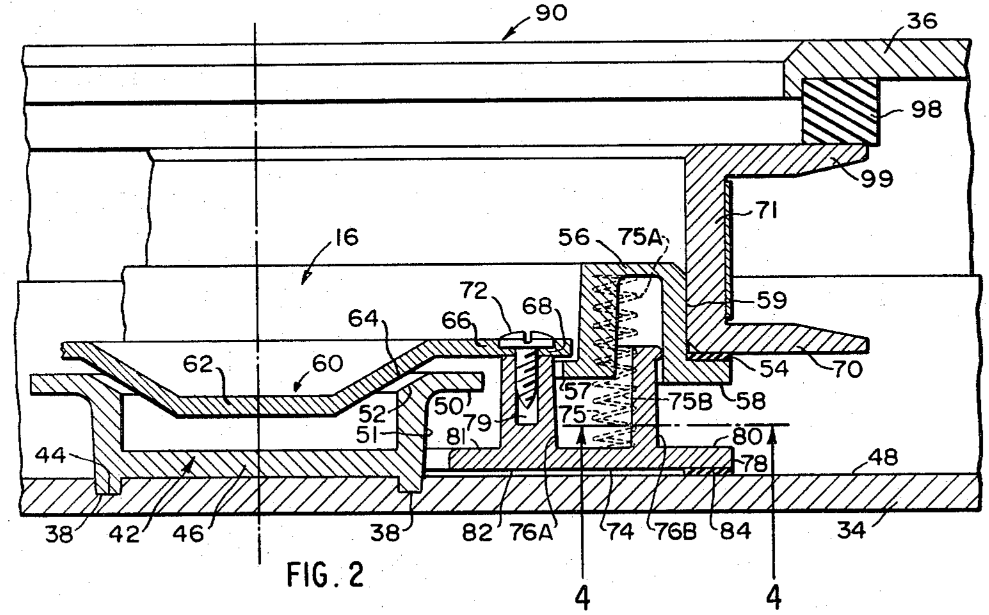
FIG. 2 is a cross-sectional view taken along line 2—2 of FIG. 1 showing a part of the cartridge including the takeup reel stabilizer system.

The cartridge of the invention shown in FIGS. 1 and 2 includes in its general organization a cover 10, a base 12, a supply reel stabilizer system 14 and a take-up reel stabilizer system 16. Supply reel 69 fits on system 14 whereas take-up reel 70 fits on system 16. Both of these reels may be the type that can be removed from its associated stabilizer system. The details of the cartridge and the manner in which it may be used are described in detail below.

In the following description the part 10 is referred to as a cover and the part 12 as a base. It is to be understood, however, that these are terms selected for convenience, and that there is no special orientation of the cartridge which requires that one or the other halves of the case be placed on the top or the bottom. In fact, in one specific installation for which this cartridge is suitable, it is used with the cover and base oriented vertically.

The cartridge case which includes the cover 10 and base 12 not only provides a housing for the reels and their stabilizing systems, but in addition defines a sealed chamber for them as well. The cover 10 has side wall 18 and 20, rear wall 22 and front wall 24 that align in edge to edge relationship with side walls 26 and 28, rear wall 30 and front wall 32 of base 12. The side walls 20 and 26 of the cover and base are joined by a piano hinge 33 that allows the case to be opened fully so that the top wall 34 of the cover and the bottom wall 36 of the base lie in the same or parallel planes.

Figure 5:
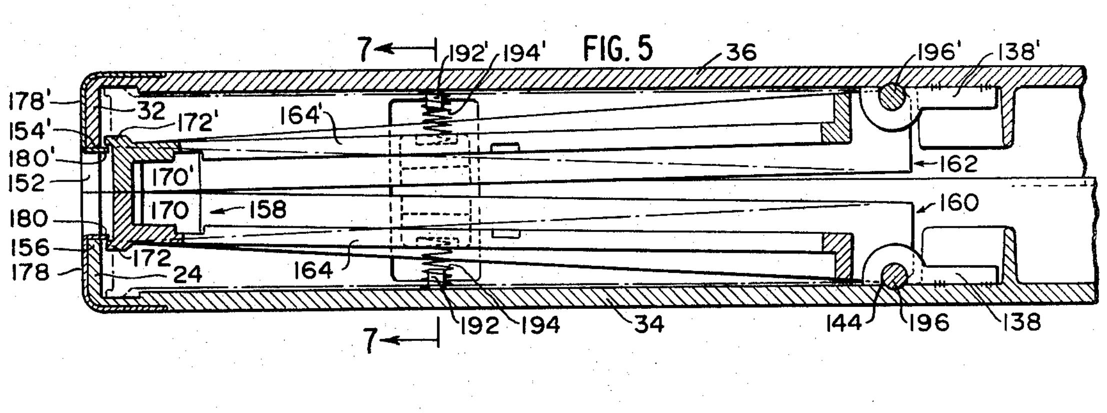
FIG. 5 is a fragmentary cross-sectional view of the cartridge.
Figure 7:
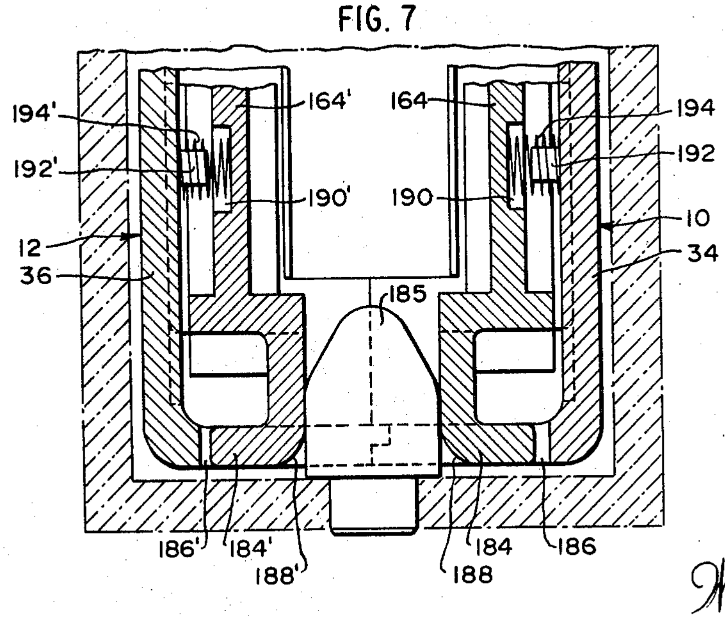
FIG. 7 is a fragmentary detail view showing the manner in which the doors are opened.

The embodiment of FIG. 1 also shows identical door halves 160 and 162 of door assembly 158. Each of these door halves is pivotally secured along one side to hinge and tape guide members 138 and 140. These door halves 160 and 162 are normally in a closed position, as shown in FIG. 5, when the cover and base are closed and the cartridge is not in use. In this position the cartridge is sealed with the door halves 160 and 162 closing the opening 152 provided in walls 24, 32. A cam block 184 is provided, along with suitable biasing means, to allow for the opening of the door halves when the cartridge is inserted into a utilization device as shown in FIG. 7, wherein finger 185 operatively cooperates with cam blocks 184 and 184'.

Supply reel 69 in FIG. 1 is partially cut away, showing a plurality of convolutions of tape 67. The tape leaves reel 69 at its outermost convolution as indicated by the dotted line, passes over idler rollers 130 and 132 and is received by take up reel 70. Idler rollers 130 and 132 may be supported on respective pivot pins 134 and 136 in a conventional manner.

When the reels are situated in the cartridge and it is in a closed position it is desireable that the reels not be free to rotate as otherwise the tape or portions thereof might get interchanged between reels or loose portions may jam in the cartridge. Therefore, brake means are provided in the form of circular brake ridges 98 and 100 protruding from wall 36. These brake means retain both reels in an immovable position when not in use, as shown in FIG. 2.

Stabilizer system 16 shown in FIG. 2 includes within its general organization dish-shaped plate 42, support member 60, ring 56 and base member 74. Plate 42 is secured to wall 34. Members 60 and 74 form a unitary part when assembled. Ring 56 is movable with reference to member 74 and is biased away from it by spring 75. All of these parts are discussed in more detail below when their structural interconnection and operation are considered.

Figure 3:
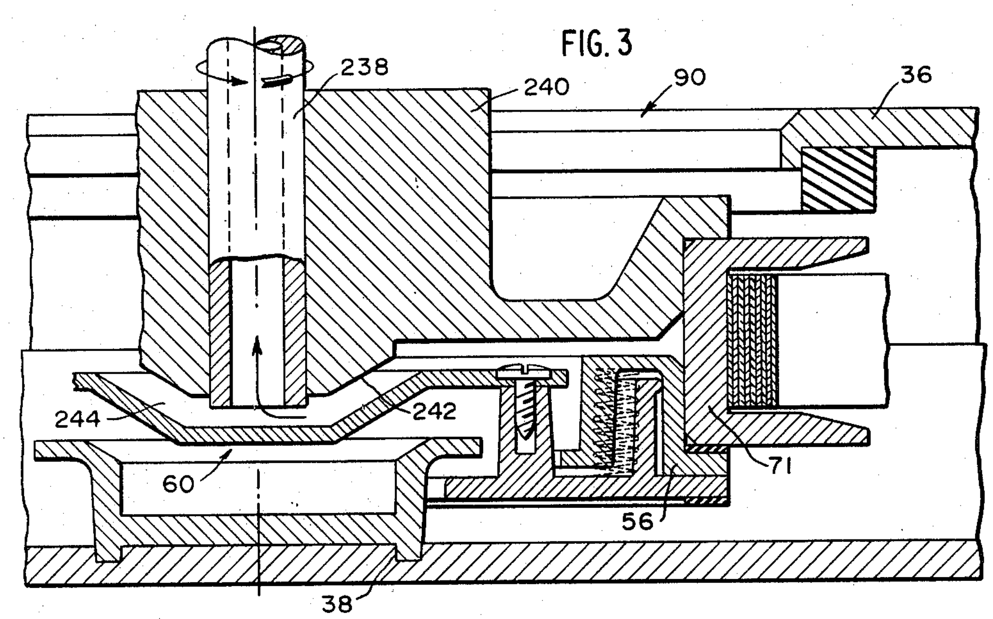
FIG. 3 is a cross-sectional view similar to FIG. 2 but with the cartridge mounted on the drive of an input machine with which it may be used.

Wall 34 of cover 10 has a pair of annular grooves 38 (one shown in FIGS. 2 and 3) in which the stabilizing systems for the supply and take-up reels are mounted. In FIGS. 2 and 3 only the take-up reel stabilizer system 16 is shown, and it is to be understood that the stabilizer systems 14 and 16 may be substantially identical. Thus, stabilizer system 16 for the take-up reel includes a dish-shaped plate 42 having an annular ridge 44 which mates with and is cemented into annular groove 38. The flat bottom wall 46 of the plate 42 abuts against the inner surface 48 of the top wall 34. The plate 42 also includes a peripheral flange 50 and bevelled annular surface 52. The flange 50 cooperates with the inwardly extending lip 81 of base member 74 and limits the axial movement of the take-up reel 70 supported on the stabilizer system 16.

It is evident in FIG. 2 that the stabilizer system 16 may move axially between positions wherein the lip 81 engages the flange 50 and wherein lip 81 lies close to the inner surface 48 of wall 34. A rubber stop 84 prevents lip 81 from having direct contact with inner surface 48. It is also evident that a certain amount of lateral play is provided by virtue of the gap between the outer cylindrical surface 51 of plate 42 and the inner diameter of lip 81.

The support member 60 includes a dish-shaped portion 62 having an outer bevelled annular surface 64, bevelled at the same angle as surface 52 of plate 42. Support member 60 also includes a flange 66 having a plurality of spaced holes 68 disposed about its periphery for accomodating a plurality of rivets 72. Each rivet 72 fits through hole 68 of member 60 and into hole 79 of base member 74.

The stabilizer system 16 of FIG. 2 is assembled as follows. The member 74 which includes inner and outer flanges 76A and 76B respectively and bottom wall 78 is placed on inner surface 48 of top wall 34. Dish-shaped plate 42 is then inserted through the hole in member 74 defined by lip 81, and is secured to surface 48. The ring 56 which includes bottom lips 57 and 58 is then placed over base member 74 with spring 75 therebetween. The cross sectional view of FIG. 4 illustrates the manner in which spring 75 is retained between ring 56 and base members 74.

Figure 4:
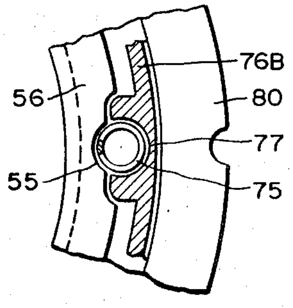
FIG. 4 is a cross-sectional view taken along line 4—4 of FIG. 2 showing a portion of the take-up reel stabilizer system.

In FIG. 4 ring 56 is shown provided with a curved recess 55 for accomodating top portion 75A of spring 75. Flange 76B is also shown provided with an inwardly jutting portion having a recess 77 therein for accomodating the bottom portion 75B of spring 75. After the springs have been set in place the rivets 72 are forced through holes 68 into hole 79 and the support member 60, base member 74 and ring 56 may be considered as forming a single unit. A stop 54 is provided on the upper surface of lip 58. In the preferred form shown, the take-up reel 70 with reel hub 71 may be removed from ring 56. When the reel 70 is in place the reel hub 71 fits tightly over the cylindrical wall 59 of ring 56.

The bottom wall 36 of the base 12 as shown in FIG. 1 includes a pair of large circular openings 90 and 92 which provide access to the tops of the take-up and supply reels, respectively. FIG. 2 shows the opening 90 and reel hub 71. Rubber rings 98 and 100 which form both the brake for the reel as well as a seal about the opening are secured to wall 36 opposite the outer flange of the supply and take-up reels, respectively. In FIG. 2 ring 98 is shown cemented to wall 36, and opposite to flange 99 of reel 70. When a reel bears against the rubber members 98 and 100 a seal is formed about the opening that prevents particles from entering the cartridge thereby protecting the tape, and furthermore, the reels are not free to rotate.

The reel 70 in FIG. 2 is shown in contact with the ring 98 in part by spring 75. When the cartridge is not in use the spring 75 is expanded and forces ring 56 and consequently reel 70 against ring 98. As a result the reel is held against rotation and the tape wound upon it will not unwind.

A similar assembly to that shown in FIG. 2 may be used for the supply reel stabilizer system 14 and may include parts similar to those shown in FIG. 2, namely, a dish-shaped plate 42, support member 60 and base member 74 and ring 56.

Supply reel 69 as well as the take-up reel 70 are readily removable from the cartridge. The reel 69 usually takes the form of a standard IBM-type compatible reel suitable for use on all forms of computers. The reel 69 is not shown in detail and typically it may be the reel shown in U.S. Pat. No. 3,229,928. The reel is readily removed from the stabilizer system 14 when the cartridge is open, and it is intended that it may be transferred from the cartridge directly onto a computer transport member.

In FIG. 1 idler rollers 130 and 132 describe a course for a portion of the tape immediately adjacent to front walls 24 and 32 of the cover and base respectfully, and opening 152 provided in the front walls is of sufficient width to draw the course of tape out of the cartridge between the two idler rollers. In FIG. 5 the opening 152 is shown defined by the spaced edges 154 and 156 of the respective walls 32 and 24. As explained in greater detail below, the tape is withdrawn through the opening 152 when either recording or reading the tape while the reels remain in the cartridge. The door assembly 158 is provided to close the opening 152 when the cartridge is not in use and prevents contaminants from entering the cartridge interior.

Figure 6:
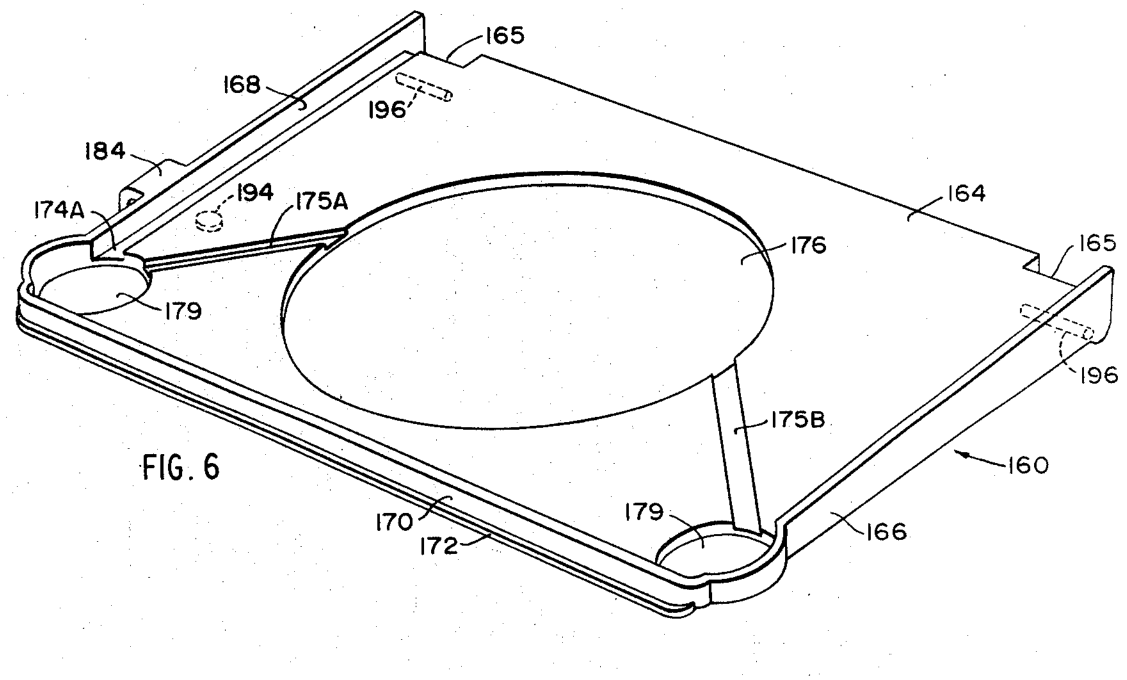
FIG. 6 is a perspective view of half of the cartridge door mechanism.

The door assembly 158 as shown in FIGS. 5, 6 and 7 includes a pair of identical halves 160 and 162. The half 160 shown in FIG. 6 includes a closure wall 170 with lateral ridge 172, and a pair of side walls 166 and 168 which are integrally formed with closure wall 170 and flat plate 164. The plate 164 includes grooves 174A, 174B, 174C, 175A and 175B for controlling and guiding the motion of the tape, and has holes 179 for accomodating the idler rollers 130 and 132. Grooves 174B and 174C are not shown in FIG. 6 but are indicated in FIG. 1. Hole 176 is slightly larger than reel 70 and is aligned with it. The plate 164 is also provided with notches 165 that mate with hinge and tape guide members 138 and 140 as is clearly shown in FIG. 5. Pivot pins 196 connect between holes provided in members 138 and 140, and thus, members 138 and 140 function as a hinge point and also as a guide for the tape.

Referring to FIG. 5 front walls 24 and 32 carry respective channel members 178 and 178'. The upper leg 180 of the channel 178 extends inwardly of the edge 156 of the wall 24, and is in the path of the lateral ridge 172 as the door half 160 moves upward to the closed position. The ridge 172 and leg 180 not only cooperate as a stop for the door half, but seal the opening as well.

To retain the door halves 160 and 162 in a closed position when the cartridge is not in use, the springs 194 and 194' are used as shown in FIGS. 5 and 7. A cam block 184 is integrally formed with side wall 168 and is exposed outside of the cartridge in the slot 186 provided in the side wall 20 of the cover. The cam block 184 has a curved edge 188 which in reaction to a force applied from the outside in the direction perpendicular to the wall 168 causes the wall to move against the bias of the spring 194 and carry the door closure wall 170 away from the opening 152. A mechanism for accomplishing this is suggested in FIG. 7, including a finger 185 which extends through the slot 186 and acts upon the cam block 184. It will be appreciated that the two door halves are identical, and that each includes a closure wall which comes together as shown in FIG. 5 to seal the opening 152. Each carries a cam block of identical form so that each of the door halves are forced into an open position as suggested by the broken lines in FIG. 5, in response to a properly directed force against the cam. It will also be appreciated that the spring 194 which is positioned between post 192 of wall 34 and recess 190 of plate 164 urges its related door to a closed position. Rather than repeat the description of the other door half, like elements in that assembly have been identified by prime numbers corresponding to the numbers of the half 160.

The two halves of the case 10 and 12 as stated, are hinged together by the piano hinge 33. The cartridge is locked in the closed position by a pair of locking members or fasteners 200 and 202 that couple between walls 18 and 28 of cover 10 and base 12.

Figure 8:
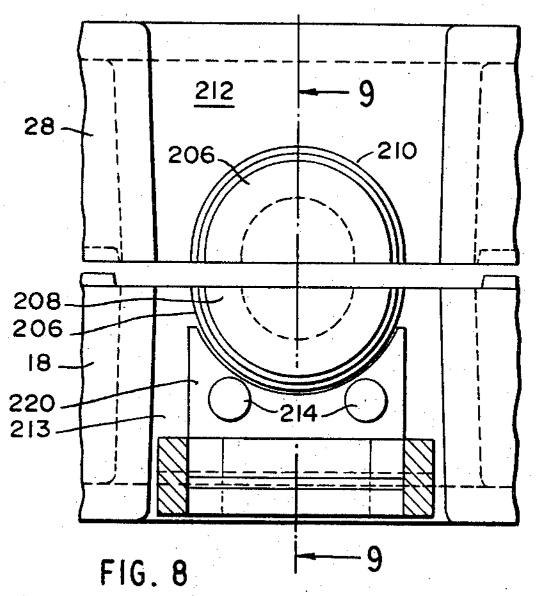
FIG. 8 is an enlarged fragmentary view of one of the cartridge locks in an unsecured, open position.
Figure 9:
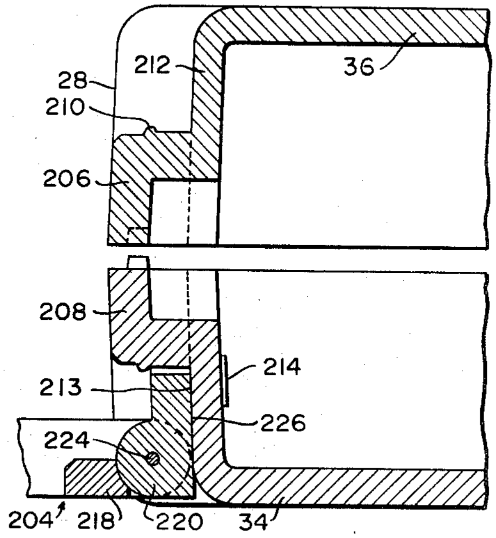
FIG. 9 is a cross-sectional view taken along line 9—9 of FIG. 8.

In FIGS. 8 and 9 one of the fasteners is shown in respective front and cross-sectional side views, in an open position. The side wall 28 is provided with a recessed surface 212 and has a semi-circular half 206 protruding therefrom. Half 206 is integrally formed with both wall 28 and recessed surface 212 and includes a circular ridge 210. Similarly, the side wall 18 has a recessed surface 213 and semicircular half 208 including a ridge 211. Surface 213 has a hinge member 204 pivoted therefrom. The hinge member 204 includes a secured hinge piece 220 with flat surface 226 that abuts against surface 213 and is secured thereto by two rivets 214.

Figure 10:
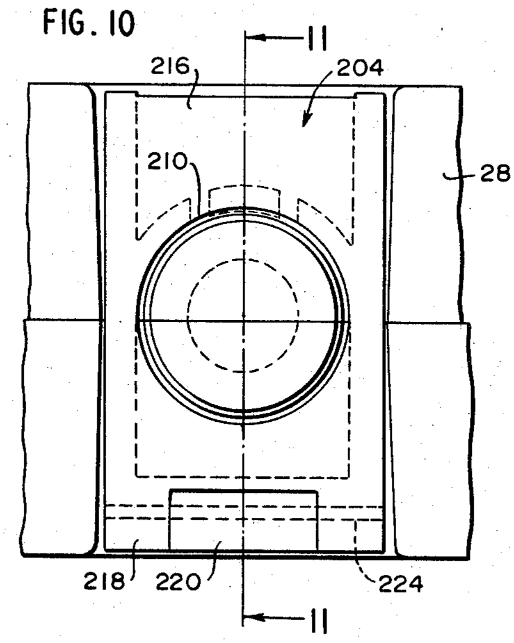
FIG. 10 is an enlarged fragmentary view of one of the cartridge locks in a closed, secured position.
Figure 11:
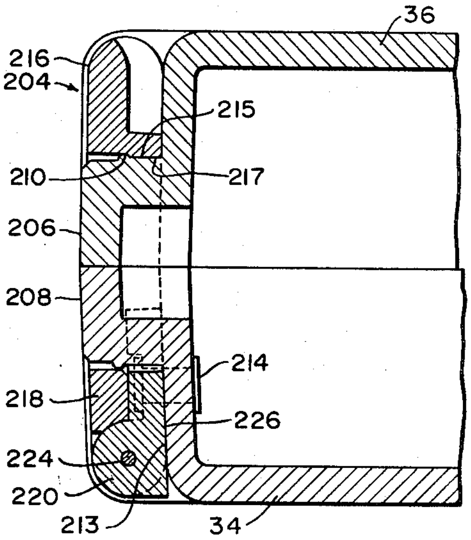
FIG. 11 is a cross-sectional view taken along line 11—11 of FIG. 10.

FIGS. 10 and 11 show one fastener in respective front and cross-sectional side views, in a closed position. Hinge member 204 also includes a top portion 216 integrally formed with a bottom portion 218. The member 204 is secured at bottom portion 218 to hinge piece 220 by means of pivot pin 224. In a closed position the hinge member 204 is secured about the semi-circular halves 206 and 208 and the inner surface 215 of top portion 216 mates with peripheral surface 217 of half 206 thereby providing a tight lock.

Having described in detail the cartridge of this invention, a typical use for it will be described. However, it is to be understood that the cartridge may be used with other forms of equipment and in combination with other devices, and this description is in no way to limit the breadth of this invention.

In FIG. 3 a typical drive and support system for the cartridges is suggested. A drawer (not shown) is used usually to house the cartridge. A pair of drive motors (not shown) are usually used to drive the supply and take-up reels. As shown in FIG. 3 the motors include a hollow tubular shaft 238 which may be connected through some means to a vacuum pump (not shown). Pinned to each shaft is a drive spindle 240 which in turn engages the reel hub to impart rotation to it. It will be noted that the spindle 240 has a diameter slightly smaller than the opening 90 in wall 36. Consequently, the spindle 240 extends into the cartridge and engages the hubs of each reel. It will also be noted that the spindle in the embodiment shown is provided with a bevelled face 242 which serves to align the reel hub with the motor shaft so that they may engage in the position shown in FIG. 3. The freedom of axial and lateral movement provided for each reel on its stabilizer system enables the reel in each instance to shift so as to align itself with the motor shaft. When the spindle 240 moves into the cartridge through the opening 90 in the wall 36 and engages the reel in the manner shown, the reel unseats from the rubber brake ring 98 so that the reel is free to rotate.

The spindle 240 of each motor also serves to define a vacuum chamber 244 in combination with the reel hub, the member 60 and ring 56. The vacuum chamber 240 in communication with the hollow shaft 238 enables a vacuum pump (not shown) to draw a vacuum in the space between the reel and spindle, which causes the reel to be drawn tightly on to the spindle 240 so as to rotate with it.

Figure 12:
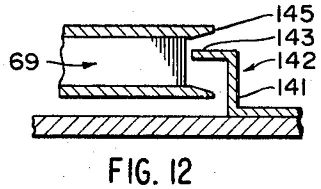
FIG. 12 is a cross-sectional view taken along line 12—12 of FIG. 1 showing a peripheral tape guide.

FIG. 12 supply reel 69 includes an outer peripheral edge 145 that fits over guide 142. Guide 142 includes a bottom support portion 141 that is integrally formed with top wall 34, and an overhanging lip 143 that is integrally formed with bottom support portion 141. The guide 142 prevents the tape from slipping off the reel 69.

Having described in detail one embodiment of this invention and the manner in which it may be utilized, those skilled in the art will appreciate that many modifications may be made of the invention without departing from its spirit.

What is claimed is:

1. A tape cartridge comprising a cover and a base respectively having top and bottom walls and having a peripheral edge wall, a supply reel stabilizer system provided in the cartridge between the top and bottom walls for releasably receiving a tape reel, a take-up reel stabilizer system in the cartridge between the top and bottom walls, an opening in the front of the peripheral wall through which the tape may be withdrawn out of the cartridge between travel from the supply to the take-up reel, means in the cartridge adjacent the front for supporting a course of tape connecting the tape wound on the supply and take-up reels adjacent the opening in a position to be withdrawn through it, and means for locking the cover and base when closed including cover and base portions protruding from respective edge walls and a locking member having an opening defined therein, said opening of the locking member being similarly configured to the protruding cover and base portions and adapted to fit over and mate with the cover and base portions when the cover and base are closed.

2. A tape cartridge as defined in claim 1 wherein said locking means further includes a hinge piece pivotaly secured to an edge wall of the cover.

3. A tape cartridge as defined in claim 2 further characterized by at least two locking means.

4. A tape cartridge as defined in claim 2 wherein said opening is circular and said cover and base portions are each semicircular in cross-section.

5. A tape cartridge as defined in claim 4 wherein the cover and base portions are each integrally formed with the respective cover and base.

6. A tape cartridge comprising a cover and a base respectively having top and bottom walls and having a peripheral edge wall, a supply reel stabilizer system provided in the cartridge between the top and bottom walls for releasably receiving a tape reel, a take-up reel stabilizer system in the cartridge between the top and bottom walls, an opening in the front of the peripheral wall through which the tape may be withdrawn out of the cartridge between travel from the supply to the take-up reel, means in the cartridge adjacent the front for supporting a course of tape connecting the tape wound on the supply and take up reels adjacent the opening in a position to be withdrawn through it, a door movable in the cartridge for closing the opening when the cartridge is not in use, said door comprising a pair of closure walls that move toward one another on the inside of the peripheral wall to close the opening and that move away from one another to uncover the opening, a pair of flat plates coupled to said closure walls and disposed adjacent respective top and bottom walls of the cover and base for carrying each closure wall and pivotally anchored at their ends away from each closure wall, and means for biasing the walls to the closed position.

7. A tape cartridge as defined in claim 6 wherein each flat plate includes a plurality of grooves disposed therein adjacent the peripheral walls for guiding the tape between travel from the supply to the take-up reel.

8. A tape cartridge as defined in claim 6 wherein each closure wall is integrally formed with its associated flat plate and wherein each flat plate has at least one hole therein for accommodating the take-up reel when the cover and base are closed.

9. A tape cartridge as defined in claim 6 further characterized by said door carrying an actuating member on its outer surface accessible from outside the cartridge enabling the door to be opened automatically from the outside.

10. A tape cartridge as defined in claim 6 wherein said biasing means includes a coil spring fixed in position between the top wall of the cover and the flat plate.

11. A tape cartridge as defined in claim 10 wherein said biasing means includes a second coil spring fixed in position between the bottom wall of the base and the other flat plate.

12. A tape cartridge as defined in claim 11 wherein the coil spring is located near the actuating member.

13. A tape cartridge comprising a cover and a base respectively having top and bottom walls and having a peripheral edge wall, a supply reel stabilizer system provided in the cartridge between top and bottom walls for releasably receiving a tape reel, a take-up reel stabilizer system in the cartridge between the top and bottom walls, an opening in the front of the peripheral wall through which the tape may be withdrawn out of the cartridge between travel from the supply to the take-up reel, means in the cartridge adjacent the front for supporting a course of tape connecting the tape wound on the supply and take-up reels adjacent the opening in a position to be withdrawn through it, said take-up reel stabilizer system including means enabling the take-up reel to move axially, and laterally in the cartridge, said enabling means including a dish-shaped member secured to the inside of the top wall of the cover and having an upper lateral flange, a reel support member surrounding said dish-shaped member and including a lip extending under the flange, said reel support member further including an annular ring for accomodating the take-up reel, and a spring means coupled between the annular ring and the reel support member.

14. A tape cartridge as defined in claim 13 wherein the take-up reel is movable on the reel support member.

15. A tape cartridge as defined in claim 13 wherein said spring means includes a coil spring.

16. A tape cartridge as defined in claim 15 wherein separate end portions of said spring are contained within respective aligned recesses in the annular ring and reel support member.

17. A tape cartridge comprising a cover and a base respectively having top and bottom walls and having a peripheral edge wall, a supply reel stabilizer system provided in the cartridge between the top and bottom walls for releasably receiving a tape reel, a take-up reel stabilizer system in the cartridge between the top and bottom walls, an opening in the front of the peripheral wall through which the tape may be withdrawn out of the cartridge between travel from the supply to the take-up reel, means in the cartridge adjacent the front for supporting a course of tape connecting the tape wound on the supply and take-up reels adjacent the opening in a position to be withdrawn through it, said supply reel stabilizing system includes means enabling the supply reel to move axially and laterally in the cartridge, said enabling means including a dish shaped member secured to the top wall of the cover and having an upper lateral flange, a reel support member surrounding said dish-shaped member and including a lip extending under the flange, said reel support member further including an annular ring for accomodating the supply reel, and a spring means coupled between the annular ring and the reel support member.

18. A tape cartridge as defined in claim 17 wherein said spring means includes a coil spring.

19. A tape cartridge as defined in claim 18 wherein separate end portions of said spring are contained within respective aligned recesses in the annular ring and reel support member.

20. A tape cartridge comprising a cover and a base respectively having top and bottom walls and having a peripheral edge wall, a supply reel stabilizer system provided in the cartridge between the top and bottom walls for releasably receiving a tape reel, a take-up reel stabilizer system in the cartridge between the top and bottom walls, an opening in the front of the peripheral wall through which the tape may be withdrawn out of the cartridge between travel from the supply to the take-up reel, means in the cartridge adjacent the front for supporting a course of tape connecting the tape wound on the supply and take-up reels adjacent the opening in a position to be withdrawn through it, and tape guide means having a curved shape and located adjacent a portion of the outer periphery of the supply reel, said tape guide means including a base portion attached to the top wall of the cover and a top lip that extends above and over the portion of the outer periphery of the supply reel.

* * * * *